Sept. 2, 1969 G. E. PIHL 3,465,333

ELECTROMAGNETIC INDICATOR HAVING PLURAL MAGNETICALLY INTERACTING INDICATOR ELEMENTS

Filed July 31, 1967

INVENTOR.

GEORGE E. PIHL

BY

Nicholas A. Pandiscio

ATTORNEY

United States Patent Office 3,465,333
Patented Sept. 2, 1969

3,465,333

ELECTROMAGNETIC INDICATOR HAVING PLURAL MAGNETICALLY INTERACTING INDICATOR ELEMENTS

George E. Pihl, Abington, Mass., assignor to Miniature Electronics Components Corp., Holbrook, Mass., a corporation of Massachusetts Filed July 31, 1967, Ser. No. 657,344
Int. Cl. G08b 5/24
U.S. Cl. 340—373 29 Claims

ABSTRACT OF THE DISCLOSURE

A hermetically sealed, two-state electromagnetic indicating device including first and second radially polarized magnetic indicators rotatable on parallel axes and having interacting magnetic fields for preventing rotational movement of the indicators in both states. The preferred embodiment also comprises electromagnetic means energizable to provide first and second magnetic fields for overcoming the force of the interacting magnetic fields in the first state and to move the first and second indicators, respectively, to the second state, and reset means for providing third and fourth magnetic fields for overcoming the interacting magnetic fields in the second state and returning the first and second indicators, respectively to the first state.

This invention relates to two-state electromagnetic indicating devices, and more particularly to such devices having two cooperating magnetically interacting magnetic indicators.

Indicating devices which monitor the presence or absence of electrical signals have several primary requirements: ease of inspection, high resistance to shock and vibration which may cause false indications, and adequate hermetic sealing to protect against dust, moisture, etc.

These requirements are intensified in aerospace applications where reliability and accuracy are essential. Additional requirements of low power, small size and rapid response in such applications provide further complications.

These problems have been variously dealt with but have not been effectively eliminated.

Accordingly it is a primary object of this invention to provide an efficient, low power, miniature electromagnetically operative two-state indicating device in a compact structure for reliable operation in installations subject to shock and vibration.

It is a further object of this invention to provide such a device in which magnetic interaction of the indicating elements, independent of external power or the surrounding structure, prevents movement of those elements by shock or vibration which may cause erroneous indications.

It is a further object of this invention to provide such a device whose display is readily visible in both states even in installations where light contrast is poor.

It is a further object of this invention to provide such an indicating device which is switchable to one of the states by electromagnetic means and to the other by either mechanical or electromagnetic means.

The invention is accomplished by a two-state indicating device including first and second magnetic indicators having interacting magnetic fields for preventing in both of the states rotational movement of the indicators relative to each other, and electromagnetic means energizeable to magnetically overcome the action of the interacting magnetic fields in the first of the two states and rotate the two second indicators to indicate the second of the states.

Preferred embodiments include mechanical manually operable means for subjecting the indicators to magnetic forces that overcome the interacting magnetic fields in the second state and returning the two indicators to the first state. Other embodiments include electromagnetic means energizable to overcome the interacting magnetic fields in the second state and return them to the first state. The electromagnetic means provide two magnetic fields, one for rotating each of the indicators.

Other objects, features, and advantages will occur from the following description of a preferred embodiment of the invention as shown in the attached drawings in which.

Figures 1, 2, 3, 4, 5:
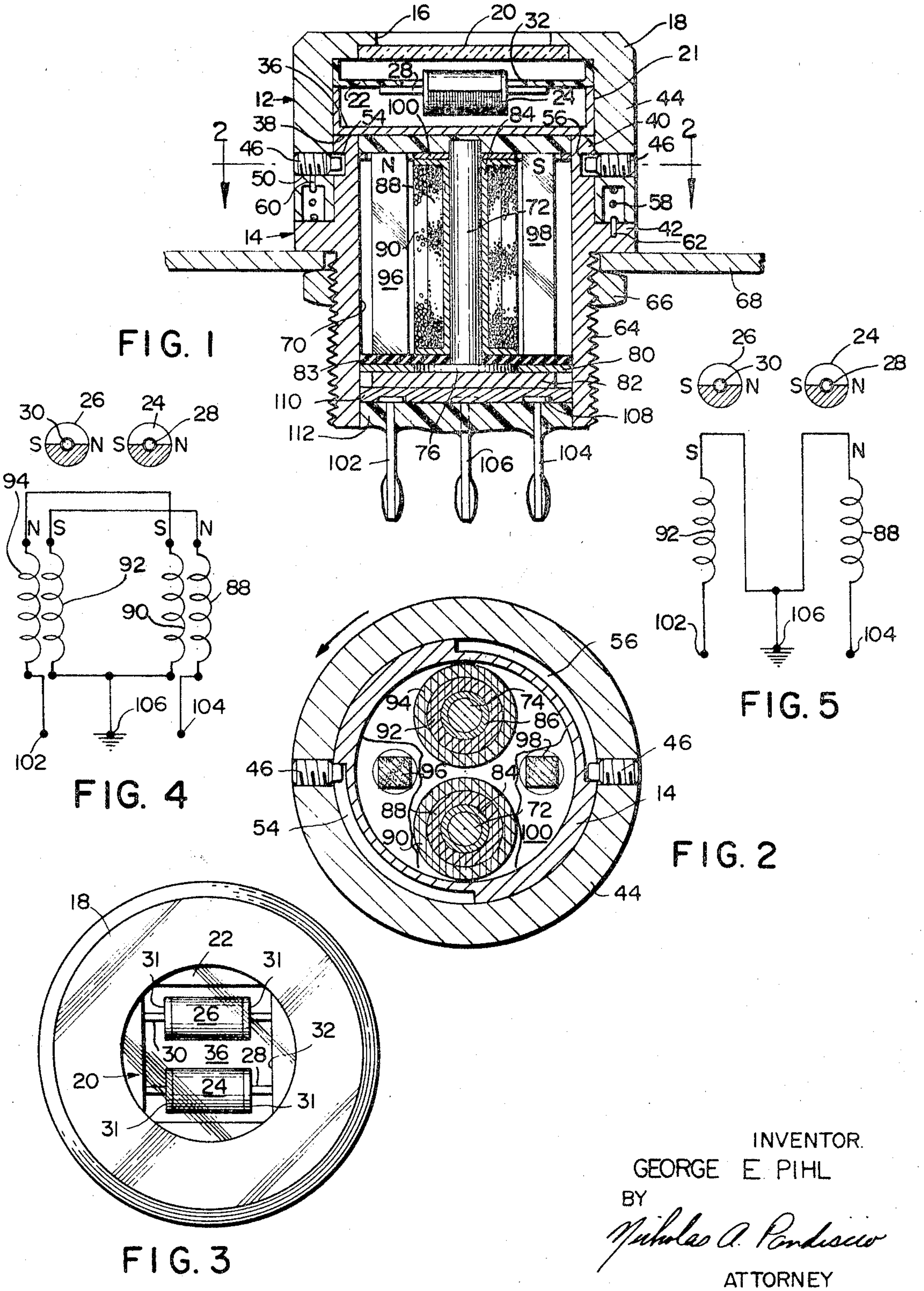
FIG. 1 is an enlarged, elevational, sectional view of an indicating device according to this invention.
FIG. 2 is a sectional view along lines 2—2 of FIG. 1.
FIG. 3 is a front view of the device showing its display area.
FIG. 4 is a schematic diagram of one electrical circuit for the device, when it includes four coils.
FIG. 5 is a schematic diagram of another electrical circuit for the device when it includes two coils.

There is shown in FIG. 1 a two-state indicating device comprising a hermetically sealed display assembly 12 rotatably mounted on a metal case 14. Aperture 16 in housing 18 of assembly 12 is sealed by a glass window 20 which is cemented in place. Immediately below window 20 in bore 21 of housing 18 is a cup shaped nonmagnetic mask 22 whose upper surface visible in part through window 20 is colored white. Mask 22 is cemented to housing 18 and carries two indicators 24 and 26 in the form of cylindrical radially polarized ceramic permanent magnets. Indicators 24 and 26 are rotatably mounted on parallel pins 28 and 30 which are fastened to the underside of the mask. These indicators have low inertia since they are cylindrical and light weight. As shown in FIG. 4, the center holes in the two indicators through which extend the pins 28 and 30 are substantially larger in diameter than the pins. This not only assures that the two indicators will rotate freely but also allows them to rotate eccentrically on the pins. Two discs 31 on each of the pins 28 and 30 prevent axial movement of indicators 24 and 26. Portions of both indicators protrude through opening 32 in the mask 22 and are clearly visible with a portion of the upper white surface of mask 22 through window 20. An aluminum cup-shaped spacer 36 is cemented in bore 21 and rests on the rim 38 of case 14. The upper surface of this cup visible in part through window 20 and opening 32 also is colored white.

One half of each indicator (the upper half as seen in FIGS. 1 and 4) is white, while the other half (the lower half as seen in FIGS. 1 and 4) is red. The resultant display enables the two states of the device to be easily distinguished, for in one state the view through window 20 is of one uniform color, white, while in the other the white surface of mask 22 contrasts with the red portions of indicators 24 and 26 visible in this state. Of course the indication may be accomplished by any two contrasting colors, shades of the same color, or surfaces of contrasting texture of reflectance.

Case 14 has a neck 40 that projects within bore 21 of housing 18 and an annular flange 42 which supports the cylindrical wall 44 of housing 18. A pair of set screws 46 mounted in threaded apertures 50 in wall 44 extend into annular grooves 54 and 56 formed in case 14. The engagement of set screws 46 with case 14 prevents axial disengagement of housing 18 and case 14 but permits limited (almost 90°) rotation of housing 18 relative to case 14. A spring 58 having tabs 60 and 62 fastened to housing 18 and case 14, respectively, normally biases housing 18 to the position shown in FIG. 1.

Below flange 42 case 14 has external threads for receiving a lock nut 66 for mounting the device in a supporting panel 68. Central bore 70 in case 14 contains two magnetic cores 72, 74 each having a flanged base 76 set in an insulating washer 80 resting on a magnetic connector 82 for cores 72 and 74. Cores 72 and 74 are made of soft magnetic material and are copper plated. The base 76 of core 74 is not visible. Resting on flanged bases 76 is an epoxy fiberglass insulator 83 which supports insulator coil forms 84 and 86 mounted on cores 72 and 74, respectively.

Coil from 84 supports a monitoring or drove winding 88 and a reset winding 90; coil form 86 supports a monitoring or drive winding 92 and a reset winding 94. Case 14 also contains two elongate permanent reset magnets 96 and 98 of square cross-section positioned in a plane which is transverse to the plane of cores 72 and 74. An anodized aluminum front support 100 overlies coil forms 84 and 86 and has holes to accommodate and align cores 72 and 76 and magnets 96 and 98. Front support 100 is broken away in FIG. 2 to reveal the two coil assemblies. Potting compound is applied over front support 100 to hermetically seal off the coil assemblies. Three terminal lugs, a reset lug 102, a monitor lug 104 and a common lug 106 extend into bore 70 and are connected to appropriate conductive lands 108 on a printed circuit board 110. Although not shown, it is to be understood that the lands 108 receive leads from coils 88, 90, 92 and 94. The terminal lugs are reinforced by epoxy-type potting compound 112.

Cores 72 and 74 are spaced from each other a distance greater than the distance between pins 28 and 30, with the result that they are not directly beneath pins 28 and 30 respectively but are offset to the outside in order to initially obtain more than a 90° rotation of indicators 24 and 26 by the magnetic fields generated by coils 88 and 92, and 90 and 94. Reset magnets 96 and 98 are similarly positioned with respect to pins 29 and 30 when housing 18 is in the 90° rotated position.

Referring now to FIG. 4, the monitoring or drive coils 88 and 92 are wound and series connected between lugs 104 and 106 so that a pulse to lug 104 causes them to generate axially aligned oppositely polarized magnetic fields. Reset coils 90 and 94 are wound and series connected between lugs 102 and 106 so that a pulse on lug 102 causes them to generate axially aligned oppositely polarized magnetic fields, with the field of coil 90 oppositely polarized with respect to the field of coil 88 and the field of coil 94 oppositely polarized with respect to the field of coil 92. As connected in FIG. 4 coils 88, 90, 92 and 94 are operated on like polarity electric signals or pulses. By reversing the direction of coil windings opposite polarity signals may be used.

In operation, with coils 88, 90, 92 and 94 deenergized and the device in the noncontrasting state in which only white appears in window 20, i.e., the south magnetic pole of indicator 24 and the north magnetic pole of indicator 26 are facing each other and, independently of external structure of magnetic fields, the oppositely oriented magnetic fields of the two indicators interact and provide a force of magnetic attraction sufficient to prevent rotation of the indicators by extraneous forces. In other words, the two indicators are magnetically latched together with the magnitude of the latching force depending in part upon the spacing between the two indicators. A signal appearing now at lug 104 produces the fields in coils 88 and 92 as shown in FIG. 4. The fields of coils 88 and 92 must be sufficient to overcome the interacting fields of the indicators. The field of coil 88 initially repels the north pole of indicator 24 and then as the indicator rotates it attracts the south pole of the indicator. The field of coil 92 initially repels the south pole of indicator 26 and then as the indicator rotates it attracts the north pole of the indicator. The display in window 20 now indicates the other state of the device in which two red areas are surrounded by a stabilizing contrasting white area. Though inverted the indicators are again magnetically latched against rotation by extraneous forces.

The device may be reset to the noncontrasting all white state by a signal on lug 102 which produces magnetic fields at coils 90 and 94 which are oppositely polarized relative to the fields produced by coils 88 and 92, respectively. The field of coil 90 initially repels the south pole of indicator 24 and then as the indicator rotates the field attracts the indicator's north pole; at the same time, the field of coil 94 initially repels the north pole of indicator 26 and then as the indicator rotates the field attracts the indicator's south pole. In this way the fields rotate the indicators back to their positions indicative of the noncontrasting state in which an all-white display is visible.

Alternatively the device may be reset manually to the noncontrasting all-white state by rotating assembly 12 counterclockwise, i.e., in the direction shown by the arrow in FIG. 2, placing indicator 24 over the south pole of permanent magnet 98 and indicator 26 over the north pole of permanent magnet 96. The fields of magnets 96 and 98 are sufficiently strong to overcome the forces of interacting fields of the indicators in the contrasting display state and rotate them back to the noncontrasting state in which only white is visible at window 20. The south pole of magnet 98 initially repels the south pole of indicator 24 and then as the indicator rotates it attracts its north pole. The north pole of magnet 96 initially repels the north pole of indicator 26 and then as the indicator rotates it attracts the south pole of the indicator. When the rotational force applied to housing 18 is removed spring 58 returns assembly 12 to its normal position with the indicators proximate cores 72 and 74.

It should be appreciated that separate reset coils are not necessary as a reverse polarity signal on the drive coils 88 and 92 can be used to reset the indicators. FIG. 5 illustrates a suitable circuit for operating the device when reset coils 90 and 94 are omitted or not used. Drive coil 88 is series connected between lugs 104 and 106 while drive coil 92 is series connected between lugs 102 and 106. Coils 88 and 92 are wound so that pulses of like polarity applied to lugs 104 and 102 cause the two coils to generate oppositely polarized magnetic fields. Assuming that the device is initially in the noncontrasting all-white state in which the south pole of indicator 24 and the north pole of indicator 26 are facing each other, the other state of the device is achieved by applying to lugs 104 and 102 signals with a polarity such as to produce fields in coils 88 and 92 as shown in FIG. 5. The field of coil 88 initially repels the north pole of indicator 24 and the field of coil 92 initially repels the south pole of indicator 26 with sufficient force to overcome the mutual attraction of the two indicators and cause them to start reversing their positions so as to display their red areas. The reversal is completed by magnetic attraction in the manner previously described. To reset the device to the all-white noncontrasting state, coils 88 and 92 are again energized, but this time with pulses of polarity opposite to that of the pulses previously used, i.e., so that the field of coil 88 will repel the south pole of indicator 24 and the field of coil 92 will repel the north pole of indicator 26. With respect to the circuit of FIG. 5, it is to be appreciated that it is not necessary to energize both coils to cause the device to undergo a change of state. Thus it is possible to apply a pulse of appropriate polarity solely to coil 88 (or coil 92) to achieve one state and a pulse of appropriate polarity to coil 88 or to coil 92 (or both) to achieve the reverse state. If coil 88 is energized so that its field is effective to cause indicator 24 to reverse its current position, the other indicator member 26 will be magnetically influenced by indicator 24 to do the same. The pulse applied to the coil must be of sufficient duration to allow the second indicator to be reversed by the first. While this mode of operation is satisfactory for many purposes, it is not preferred since energizing both coils simultaneously provides greater sensitivity.

It is to be noted also that when reset coils 90 and 94 are omitted, the coils 88 and 92 may be connected in series rather than in parallel with each other and when so connected, the device can be made to assume first one and then the other of its two states by changing the polarity of the pulses applied to the two coils. One form of circuit that may be employed for this purpose consists of connecting the series connected coils between common lug 106 on the one hand and lugs 102 and 104 on the other hand, with pulses of one polarity applied to lug 102 and pulses of opposite polarity applied to lug 104.

It is to be noted that still other circuit configurations may be employed to operate various modifications of the inventions.

The invention provides a number of advantages. The device can be made in miniature size, is reliable, offers the choice of manual or electrical resetting, includes a hermetically sealed indicator assembly, is easy to mount, and provides a latching display. Moreover, making the holes in indicators 24 and 26 oversize so that they can wobble on pins 28 and 30 is not necessary but appears to provide improved latching and somewhat faster response.

Other embodiments will occur to those skilled in the art and are within the following claims.

What is claimed is:

1. A two-state electromagnetic indicating device comprising:

first and second rotatable magnetic indicators having interacting magnetic fields for preventing in both said states rotational movement of said indicators relative to each other, said indicators normally indicating one of said states, and electromagnetic means energizable to provide a first magnetic field for overcoming the action of said interacting magnetic fields in the first of said states and to rotate said indicators to indicate the second of said states.

2. The device of claim 1 in which said indicators are radially polarized.

3. The device of claim 1 in which said electromagnetic means includes a drive coil arranged so that the axis of said first magnetic field is transverse to and offset from the axes of rotation of said indicators.

4. The device of claim 1 further comprising reset means for providing a second magnetic field of opposite polarity relative to the first magnetic field by said electromagnetic means for overcoming said interacting magnetic fields in said second state and returning said indicators to said first state.

5. The device of claim 4 in which said reset means includes said electromagnetic means energized in the opposite direction to provide said second magnetic field of opposite polarity.

6. The device of claim 4 in which said reset means is an electromagnetic reset coil.

7. The device of claim 4 in which said reset means includes a reset magnet spaced from said electromagnetic means and means for positioning one of said indicators in the magnetic field of said reset magnet.

8. The indicator of claim 6 in which said electromagnetic means includes a drive coil for providing said first magnetic field and said reset coil is wound concentrically with said drive coil.

9. The device of claim 1 in which said first magnetic field provided by said electromagnetic means is polarized to reverse one of said indicators from said first state.

10. The device of claim 4 in which said second magnetic field provided by said reset means is polarized oppositely to said first magnetic field so as to repel one of said indicators from said second state.

11. The device of claim 1 in which the magnetic force provided by said interacting magnetic fields which prevents movement of said indicators in said first and second states is one of attraction.

12. The device of claim 1 in which first portions of said indicators are visible in one of said states and second portions of said indicators are visible in the other of said states.

13. A two-state electromagnetic indicating device comprising:

first and second radially polarized rotatable magnetic indicators, said indicators being rotatable on parallel axes and providing interacting magnetic fields for preventing movement of said indicators in each of said states, and electromagnetic means energizable to provide first and second magnetic fields for overcoming the force of said interacting magnetic fields in a first of said states and to move said first and second indicators, respectively, to indicate the second of said states.

14. The device of claim 13 in which said electromagnetic means includes two coils providing said first and second fields, the axes of said first and second fields being transverse to, and offset from, respective ones of the said parallel axes of said indicators, the fields provided by said drive coils being of opposite polarity.

15. The device of claim 13 further comprising reset means for providing third and fourth magnetic fields of opposite polarity to said first and second fields, respectively, for overcoming said interacting magnetic fields in said second state and returning said first and second indicators, respectively, to their first state.

16. The device of claim 15 in which said reset means includes said electromagnetic means energized in the opposite direction to provide said third and fourth magnetic fields of opposite polarity.

17. The device of claim 15 in which said reset means includes two electromagnetic coils.

18. The device of claim 15 in which said third and fourth magnetic fields are spaced from said first and second magnetic fields, respectively, and said reset means further includes means for influencing said first and second indicators with said third and fourth magnetic fields, respectively.

19. The device of claim 15 in which said reset means includes first and second reset magnets, and said first and second indicators are shiftable as a unit into said third and fourth magnetic fields respectively.

20. The indicator of claim 13 in which said first state of said indicators is determined by the north magnetic pole of said first indicator and the south magnetic pole of said second indicator appearing at a first position, and said second state is determined by the south magnetic pole of said first indicator and the north magnetic pole of said second indicator appearing at said first position.

21. The device of claim 13 in which said first and second magnetic fields provided by said electromagnetic means are polarized to force said first and second indicators, respectively, to said second state.

22. The device of claim 15 in which said third and fourth magnetic fields provided by said reset means are polarized oppositely to said first and second magnetic fields to force said indicators to said first state.

23. The device of claim 13 in which the portions of said first and second indicators visible in one of said states have a first type of indicia and the portions visible in the other of said states have a second contrasting type indicia.

24. The device of claim 14 in which said device includes a mask that contrasts with the portions of said indicators visible in one of said states and is the same as the portions of said indicators visible in the other state.

25. A two-state indicating device comprising:

first and second radially polarized magnetic indicators rotatably mounted on first and second parallel axes respectively, first portions of said indicators having a first indicia and second portions of said indicators having a second indicia, said first portions visible and indicating a first state when said indicators are oriented in a first position and said second portions visible and indicating a second state when said indicators are rotated on said axes to a second position, said indicators providing interacting magnetic fields that oppose rotational movement of said indications in each of said states.

26. A two-state indicating device as defined by claim 25 wherein said indicators are disposed within a sealed case, and further including electromagnetic means outside of said case operative when energized to overcome the force of said interacting magnetic fields and move said indicators from one to the other of said first and second positions.

27. A two-state indicating device as defined by claim 26 further including a sealed housing for said electromagnetic means attached to said case.

28. A two-state indicating device as defined by claim 27 wherein said case is rotatable relative to said housing, and further wherein said housing comprises reset means operative when said case is rotated relative to said housing to restore said indicators back to the positions which they occupied before being moved by operation of said electromagnetic means.

29. A two-state indicating device as defined by claim 25 wherein said indications are permanent cylindrical magnets each with an axial bore, and said axes are shafts extending through said bores, said bores being oversize so that said indicators can rotate eccentrically on said shafts.

References Cited

UNITED STATES PATENTS

| | | | |
|---|---|---|---|
| 2,740,956 | 4/1956 | Hatton | 340—373 |
| 2,866,965 | 12/1958 | Houdek | 340—373 X |

JOHN W. CALDWELL, Primary Examiner

H. I. PITTS, Assistant Examiner

U.S. Cl. X.R.

335—219; 340—324, 378